Patented Mar. 18, 1952

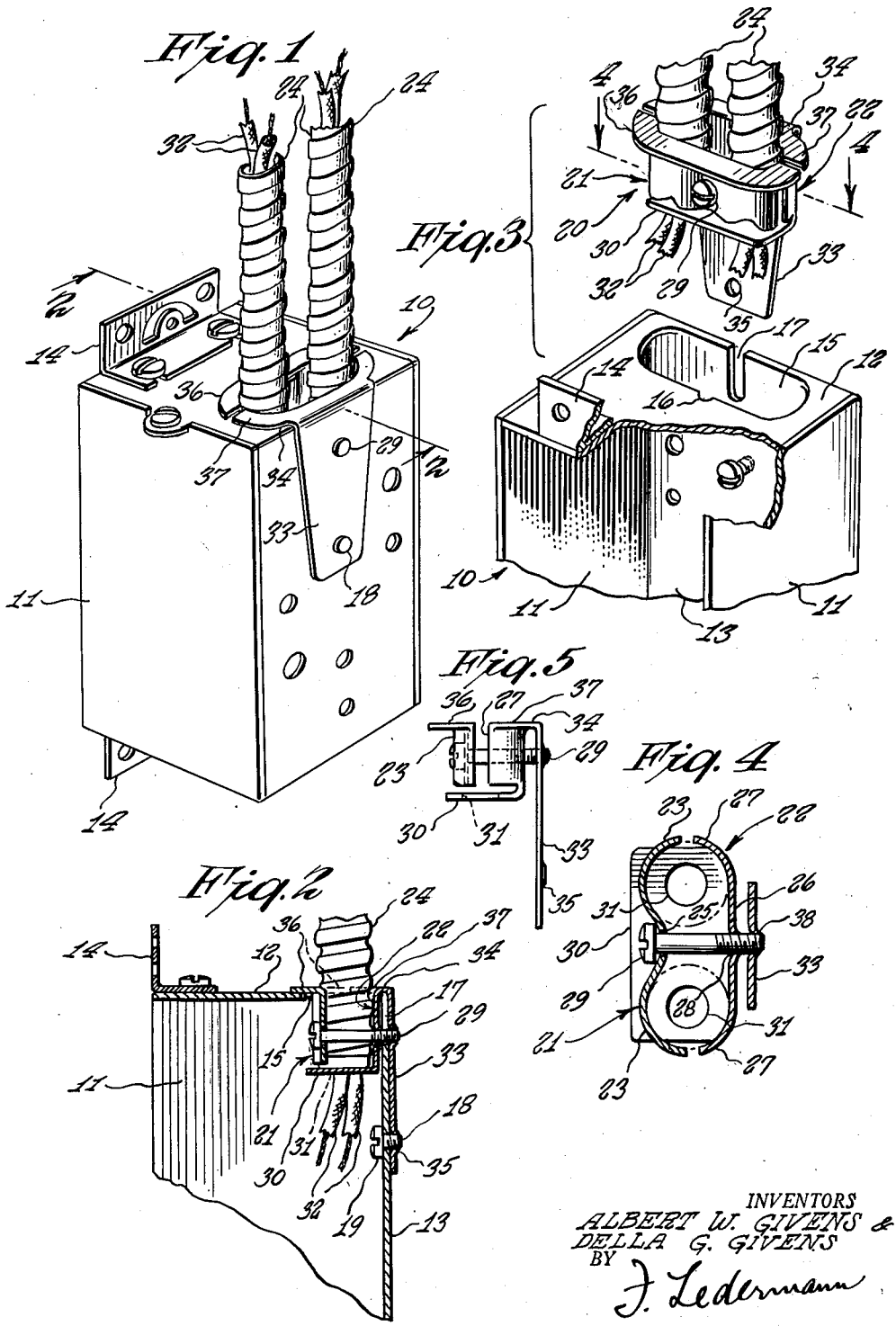

2,590,004

UNITED STATES PATENT OFFICE 2,590,004

COMBINATION CONDUIT BOX AND CABLE CONNECTOR

Albert W. Givens and Della G. Givens, Marlboro, N. Y.

Application April 14, 1949, Serial No. 87,474

2 Claims. (Cl. 285—24.5)

1

This invention relates to conduit boxes and the like, and aims primarily to provide certain new and useful improvements in such boxes whereby the operation of making connections of the ends of armored cables or tubular conduits to the box is greatly facilitated so that the making of the electric connections between the conductors and whatever other terminal members may be provided in the box, is greatly facilitated and speeded up.

Another object of the invention is the provision of a box of the type referred to and in combination therewith an armored cable end connector adapted to be secured firmly to the ends of the armored cable with the latter passing therethrough, the box being provided with a knock-out opening thereinto in which the said end connector readily registers, means being further provided for quickly and easily attaching the end connector in position to the box so that the electrical connections with the ends of the cable conductors may be conveniently made.

The above broad as well as additional and more specific objects will be clarified in the following description, wherein characters of reference refer to like-numbered parts in the accompanying drawing. It is to be noted that it is neither intended nor desired to limit the invention necessarily to any or all of the exact details of construction shown except insofar as they may be deemed essential to the invention.

Referring briefly to the drawing, Fig. 1 is a perspective view of one type of standard conduit box embodying an example of this invention, showing armored cables connected thereto and entering the box.

Fig. 2 is a sectional view taken on the line 2—2 of Fig. 1.

Fig. 3 is a fragmentary perspective view, with parts broken away and partly in section, of the box and armored cables of Fig. 1, showing the ends of the cables held by the end connector of this invention prior to insertion thereof into the knocked-out opening of the box.

Fig. 4 is a sectional view taken on the line 4—4 of Fig. 3.

Fig. 5 is a side view of the end connector per se.

Referring in detail to the drawing, the numeral 10 indicates one type of a standard outlet or conduit box, but of course the invention may also be applied to any other type of box, such as, for instance, a branch connector box, a switch box, a lamp connector box, etc. The box comprises the side walls 11, end walls 12 (of which but one is shown), and the bottom wall 13. The

2 end walls 12 are shown provided with standard attaching ears 14 for securing the box in the wall recess, not shown, in the usual manner. The end wall 12 shown has an elongated opening 15 therethrough positioned near the bottom wall 13. The other end wall 12, not shown, may be provided with a similar opening, as may also, if desired, the side walls 11. In accordance with standard practice, the opening or openings 15 could be closed by a "knock-out," not shown, that is, an area of the solid wall 12 in which the outline of the opening 15 would be cut through the box around the said outline, the said area or knock-out being normally integral with the wall 12 through connection of the usual tongue thereof, not shown, which registers in the notch 16. Upon removal of the said knock-out area, the opening 15 would be provided as shown in Figs. 2 and 3.

The ends of the bottom wall 13 are provided, along the median line thereof, with slots 17 which thus communicate with the openings 15. Spaced inward from the end of each slot 17 and positioned on the said median line of the bottom wall 13, is a threaded opening having a screw 18 therein, whose head 19 lies within the box.

A cable end connector or clamp 20 comprises an upper member 21 and a lower member 22. The member 21 is deformed into a wave-shape, substantially as shown, to provide the two spaced rounded end portions or grips 23 the radius of curvature of each of which is substantially that of the armored cables 24. An opening 25 is provided through the member 21 between the end grips 23.

The intermediate portion of lower clamp member 22 is substantially flat intermediate its width, as shown at 26, and its ends are arcuately deformed, as shown at 27, to provide complementary end grips. An opening 28, which is threaded, is provided through the member 22 is alignment with the opening 25, and the stem of a screw 29 passes through both openings 25 and 28. The forward portion of the member 22 comprises an extension 30 which is turned up at right angles to the intermediate flat portion 26 to provide a wall, and spaced openings 31 are provided therethrough; these openings are of smaller diameter than the cables 24 but are sufficiently large to permit passage therethrough of the insulated conductors 32 of each cable. Thus the wall 30 provides a forward limit stop for the ends of the armored cables 24, as shown in Fig. 2.

The rear portion of the member 22 comprises an elongation or extension from the rear edge of the flat portion 26, and this extension is doubled back to provide a tongue 33 parallel with the said flat portion 26 and spaced therefrom through the medium of the bight 34. The forward end of the tongue 33 is provided with a threaded opening 35 so positioned therein that when the connector 20 is in the position shown in Fig. 2, that is, pushed all the way into the box through the opening 15, the opening 35 aligns with the screw 18. The tongue 33 also has a threaded opening 38 to receive the screw 29.

The upper member 21 is provided at is rear end with an apron 36 adapted to overlap and thus completely close the opening 15 along the top and upper sides of the latter between the cables 24 and the upper edges of the opening 15. Similarly, a flange or apron 37 is formed integrally with the bight 34 to overlap the lower edge and the lower side edges of the opening 15. If desired, the entire clamp member 20 could be made of one piece by having the upper member 21 integral or rigid with the wall 30 and extending therefrom, but it is believed that the two part clamp member 20 may be more effective.

In use, the end connector or clamp 20 is applied to the ends of the cables 24 in the manner shown in Fig. 3, with the screw 29 tightening the clamp members or jaws 21 and 22 together against the cables 24 and the conductors 32 passing through the openings 31 in the wall 30. The connector 20 is then inserted through the opening 15 into the position shown in Fig. 2, with the screw 29 passing along the slot 17 and the end of the bottom wall 13 positioned between the flat portion 26 of the lower member 22 and the tongue 33 and the screw 18 aligned with the threaded hole 35. Tightening of the screw 18 will thus lock the member 20 to the box, with the aprons 36 and 37 positioned in overlapping position around the edges of the opening 15 for obvious reasons. Then with the cables thus held securely to the box, it is a simple matter for the electrician to work with or upon the conductors 32 to connect them to whatever other conductors or terminals in the box.

It is apparent from the above that the improvements presented by this invention result in the provision of means for working in or on such boxes by the electrician, whereby the task of the electrician is substantially simplified and the time required for his work is substantially reduced.

Obviously, modifications in form or structure may be made without departing from the spirit or scope of the invention.

We claim:

1. In combination with a conduit box having a bottom wall and a wall at right angles thereto, said last-named wall having an elongated opening therethrough positioned adjacent said bottom wall with one of the opposed longer edges of said opening positioned substantially in the plane of said bottom wall, said bottom wall having a slot extending thereinto from that edge thereof adjacent said opening, a clamp comprising a pair of separate unitary opposed jaw members, one of said jaw members having the ends thereof rounded to receive therein the ends of two armored cables, the other of said jaw members having the ends thereof complementarily rounded likewise to receive said cable ends therein, said other of said members having a rearward doubled back extension thereby providing a tongue substantially parallel with the plane of said other of said jaw members and spaced from said other of said jaw members, a screw, said jaw members and said tongue having aligned openings, said openings in said last-named jaw member and in said tongue being threaded, said screw being adapted to be passed through said opening in said first-named jaw member between said cable ends and screwed into said threaded openings to clamp said cables between said jaw members and to secure said tongue in said spaced parallel relationship with said last-named jaw member, the transverse cross-sectional area of said clamp having approximately the same outline as said wall opening and having smaller dimensions than the latter so that said clamp with said cable ends attached is slidable into the box through said wall opening, said clamp with said cables thus secured thereon being thus insertible through said wall opening with said screw registering in said slot and said bottom wall positioned between said last-named jaw member and said tongue, and means for securing said tongue to said bottom wall, and limit stop means on the rear end of said clamp engageable with said wall.

2. The combination set forth in claim 1, said limit stop means comprising aprons extending from the rear ends of said jaws and lying in a common plane parallel with the plane of said cross-sectional area, the combined area of said aprons having greater dimensions than said wall opening, said aprons thereby extending substantially beyond the peripheral edge of said wall opening thereby overlapping said wall opening edges on the outside of said end wall when said clamp member is secured to the box as aforementioned.

ALBERT W. GIVENS.
DELLA G. GIVENS.

REFERENCES CITED

The following references are of record in the file of this patent:

UNITED STATES PATENTS

| Number | Name | Date |
| --- | --- | --- |
| 2,260,806 | Hinchman | Oct. 28, 1941 |
| 2,480,522 | Tornblom | Aug. 30, 1949 |